United States Patent [19]
Canter et al.

[11] Patent Number: 5,359,280
[45] Date of Patent: Oct. 25, 1994

[54] BILATERAL POWER CONVERTER FOR A SATELLITE POWER SYSTEM

[75] Inventors: Stanley Canter, Phoenix, Ariz.; Ronald J. Lenk, Mountain View, Calif.

[73] Assignee: Space Systems/Loral, Palo Alto, Calif.

[21] Appl. No.: 192,186

[22] Filed: Feb. 4, 1994

Related U.S. Application Data

[63] Continuation of Ser. No. 818,842, Jan. 10, 1992, abandoned.

[51] Int. Cl.$^5$ .......................... G05F 1/62; H02J 7/04; H02M 3/155
[52] U.S. Cl. ................... 323/282; 323/222; 323/259; 323/906; 320/40; 363/16
[58] Field of Search ............... 323/282, 283, 222, 224, 323/284, 285, 259, 263, 906; 363/16; 320/30, 32, 39, 40

[56] References Cited

U.S. PATENT DOCUMENTS

| | | | |
|---|---|---|---|
| 4,347,474 | 8/1982 | Brooks et al. | 323/224 |
| 4,549,254 | 10/1985 | Kissel | 363/21 |
| 4,672,303 | 6/1987 | Newton | 323/285 |
| 4,729,088 | 3/1988 | Wong | 363/124 |
| 4,736,151 | 4/1988 | Dishner | 323/224 |
| 4,801,859 | 1/1989 | Dishner | 323/224 |
| 4,947,311 | 8/1990 | Peterson | 363/124 |

FOREIGN PATENT DOCUMENTS 2088159 6/1982 United Kingdom ................. 320/49

*Primary Examiner*—Steven L. Stephan
*Assistant Examiner*—Adolf Berhane
*Attorney, Agent, or Firm*—Perman & Green

[57] ABSTRACT

A bilateral power converter (10) for a satellite power system comprises a battery (12), an inductor (14), a switching means (18, 20), and a controller (16). The battery (12) preferably has a first and second terminals. The inductor (14) is coupled to the first terminal of the battery (12) and the switching means (18, 20). The switching means (18, 20) selectively couples the second end of the inductor (14) to a bus (28) or to ground ill response to a control signal. The controller (16) monitors the bus (28) voltage, current flow to the battery (12) and the current flow through the switching means (18, 20). The controller (16) also receives control signals from the satellite's computer (13) and automatically regulates the voltage on the bus (28) by adjusting the duty cycle of the signal output by the controller (16) to the switching means (18, 20). Responsive to the duty cycle of the signal output by the controller (16), the bilateral converter (10) acts either as a buck converter or a boost converter to charge or discharge the battery according to the amount of power on the bus (28).

14 Claims, 4 Drawing Sheets

BILATERAL POWER CONVERTER FOR A SATELLITE POWER SYSTEM

The invention described herein is a subject invention under U.S. government contract No. NAS3-25082, and as such the U.S. government may have rights therein.

This is a continuation of copending application Ser. No. 07/818,842 filed on Jan. 10, 1992 now abandoned.

BACKGROUND OF THE INVENTION

1. Field of the Invention

The present invention relates to satellite power systems. In particular, the present invention relates to a satellite power system employing bilateral battery charging and single set point control.

2. Description of Related Art

Power converters are well known and have been used to charge and discharge batteries. Examples of such power converters are disclosed in U.S. Pat. Nos. 4,347,474; 4,549,254; 4,672,303; 4,729,088; and 4,947,311. However, these power converters as well as other power converters in the art are not suited for use in satellites.

FIG. 1 illustrates a battery charge/discharge configuration known in the prior art. The circuit of FIG. 1 includes separate circuits for charging and discharging the battery. The charge and discharge circuits each have their own controller. The interaction of the charge and discharge circuits is controlled by steering logic that is coupled to the charge controller and the discharge controller. A particular problem with the prior art is the need for this additional steering logic to control the operation of the charge and discharge circuits. The steering logic can be very complex and also is an area of possible instability due to the interaction between the charge and discharge circuits.

Another problem with the designs of the prior art is their weight. For converters used in satellites, weight is a primary consideration because of the tremendous launch and payload costs for spacecraft. The battery charge/discharge circuit of FIG. 1 is particularly a problem since separate circuits are required to perform the charging and discharging functions; thus, the power converters add to the weight of the satellite.

A further problem with the converters of the prior art is reliability. Since the power converters will be used in satellites, they will not be easily accessible once placed in operation. Thus, separate controlling circuits and complex steering logic are areas were the converters are likely to malfunction. This tends to reduced the reliability of the entire satellite.

U.S. Pat. Nos. 4,736,151 and 4,801,859 issued to Dischner disclose a bi-directional converter, These converters are designed to operate in an electrically-compensated constant speed drive. The control of the converter is not continuous. One switch is held off while the other switch is pulse width modulated. Additionally, the converter of Dischner produces a discontinuity at zero power flow that is detrimental to power charging/discharging systems. Thus, the converters of Dischner would not be suitable for satellite applications.

DISCLOSURE OF THE INVENTION

The present invention overcomes the deficiencies of the prior art by providing a bilateral power converter (10) for a satellite power system that provides single set point control. A preferred embodiment of the power system of the present invention comprises a battery (12), an inductor (14) switching means (18, 20), an inverter (22), and a controller (16). The battery (12) preferably has first and second terminals. The inductor (14) has a first and a second end, and the first end of the inductor (14) is coupled to the first terminal of the battery (12). The switching means (18, 20) selectively couples the second end of the inductor (14) to a bus (28) or to ground in response to a control signal. The switching means (18, 20) is coupled between the second end of the inductor (14), the bus (28) and ground. The controller (16) is preferably coupled to receive control signals from a computer (13) on board the satellite, and outputs a signal for controlling the switching means (18, 20). The output of the controller (16) is also coupled to the inverter (22), whose output provides another signal for controlling the switching means (18, 20).

The controller (16) monitors the bus (28) voltage, current flow to the battery (12), and the current flow through the switching means (18, 20). The controller (16) also receives control signals from the satellite's computer (13) and automatically regulates the voltage on the bus (28) by adjusting the duty cycle of the signal output by the controller (16). Responsive to the duty cycle of the signal output by the controller (16), the bilateral converter (10) acts either as a buck converter, or as a boost converter to charge or discharge the battery according to the amount of power on the bus (28).

DETAILED DESCRIPTION OF THE PREFERRED EMBODIMENTS

The present invention is a bilateral power converter 10 for use in satellite power systems. Typically, in a satellite power system, there are at least two sources of power. First, a solar array 15 is provided to convert radiant energy into electrical energy for use by the satellite. Second, a battery 12 powers the satellite when the solar array 15 does not generate enough power to satisfy the requirements of the satellite. The prior art conventionally uses separate power converters to couple the solar array 15 and the battery 12 together according to the amount of power generated by the solar array 15. Excess power from the solar array 15 is also used to charge the battery 12. The present invention advantageously combines the separate power converters into a bilateral power converter for significant weight savings and improved reliability. The bilateral power converter 10 attempts to maintain a power bus 28 of the satellite at a preset voltage by either sinking or sourcing current to the bus 28.

Figure 2:
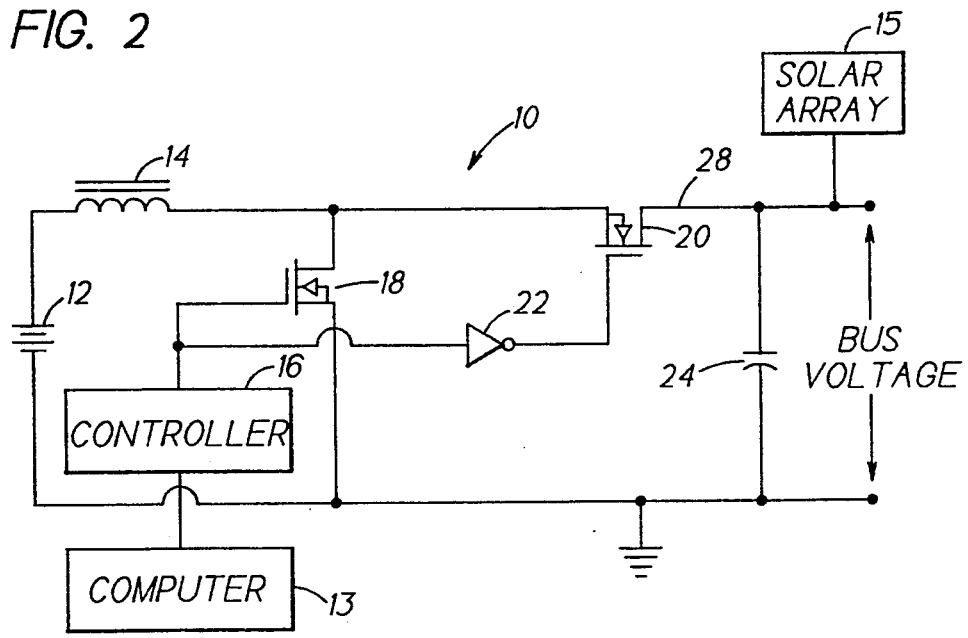
FIG. 2 is a block diagram of a preferred embodiment of the bilateral power converter of the present invention for satellites.

In FIG. 2, a simplified block diagram of a preferred embodiment of a satellite power system constructed in accordance with the present invention is shown. The present invention is preferably controlled in part by the satellite's computer 13. The bilateral converter 10 preferably comprises an inductor 14, a controller 16, a first switch 18, a second switch 20, an inverter 22 and a capacitor 24. The converter 10 is bilateral in that power can flow both to charge and discharge the battery 12. Thus, the converter 10 effectively either sinks or sources power to the bus 28 in response to signals from the controller 16.

Referring now to the simplified block diagram of FIG. 2, the present invention will generally be described. The battery 12 has a first terminal and a second terminal. The first terminal is preferably coupled to a first end of the inductor 14. The second terminal provides ground. The first switch 18 is preferably coupled between the second terminal of the battery 12 and a second end of the inductor 14. Thus, when the first switch 18 is in a closed position, the current through the inductor 14 increases in the direction of the bus 28. The capacitor 24 also has one end coupled to the second terminal of the battery 12. The second switch 20 is coupled between the second end of the inductor 14 and the other end of the capacitor 24. Thus, when the second switch 20 is in a closed position, the current through inductor 14 is increasing in the direction of the battery 12. Therefore, in accordance with the voltage level of the battery 12 and bus 28, and by varying the duty cycle of tile control signal received by the first and second switches 18, 20, the battery 12 will either be charged or discharged.

Figure 1:
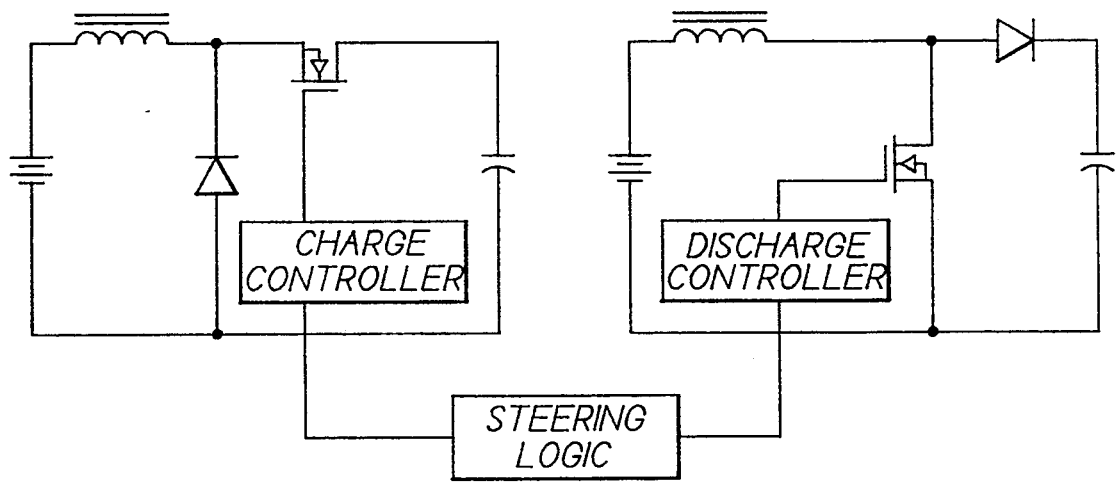
FIG. 1 is a block diagram of a prior art satellite power system.

The present invention advantageously uses a single control signal to control the closing of the first and second switches 18, 20. The control signal output by the controller 16 is coupled to activate the first switch 18. The same control signal is also coupled through inverter 22 to activate the second switch 20. The use of a single signal to control the first and second switches 18, 20 advantageously eliminates redundant control logic required by the prior art. Since the first and second switches 18, 20 are activated by control signals that are the inverse of each other, only one of the switches 18, 20 will remain closed at any particular instant. Thus, the present invention also eliminates the need for steering logic as required by the prior art device of FIG. 1.

Figure 3:
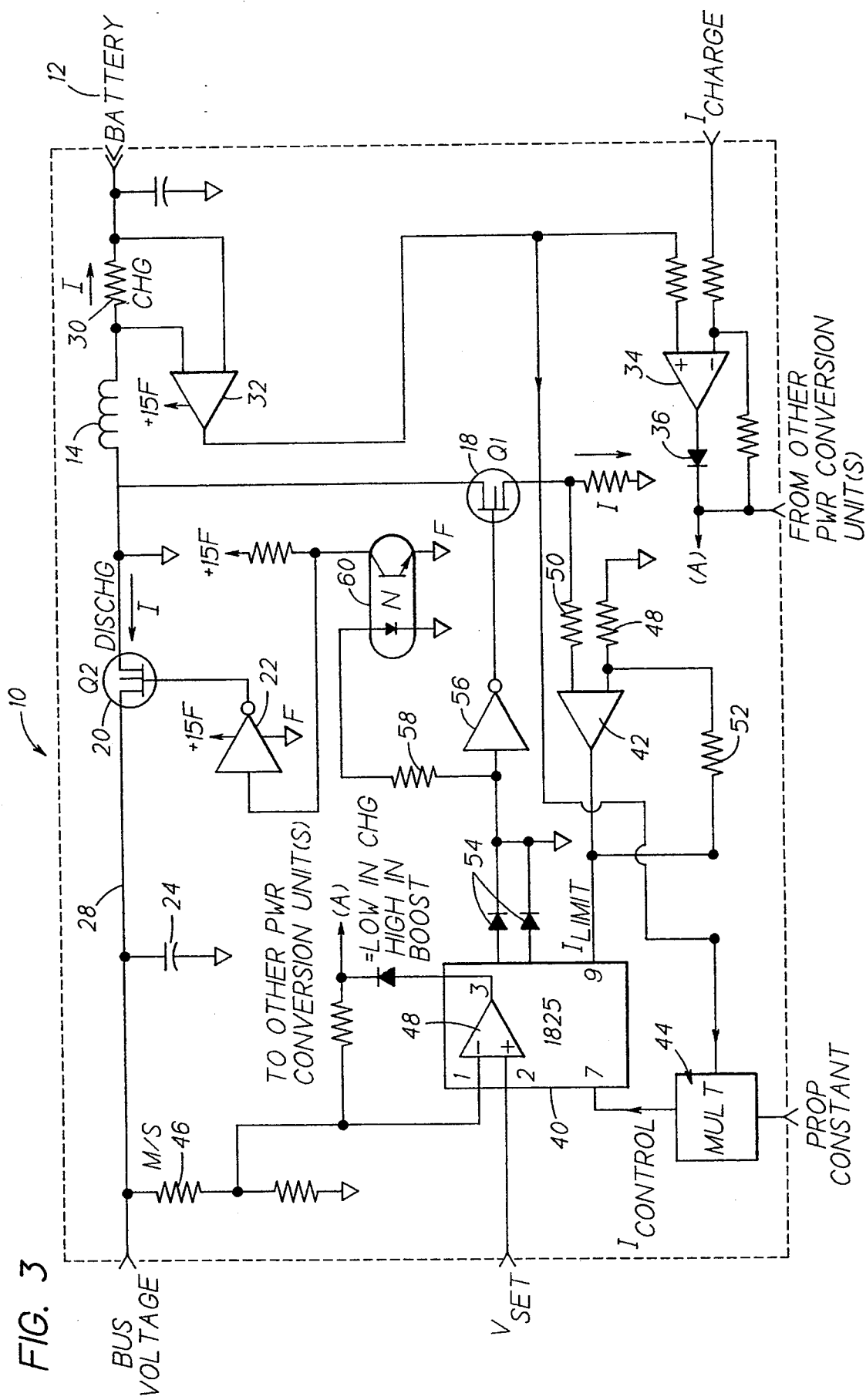
FIG. 3 is a schematic diagram of tile preferred embodiment of the bilateral power converter of the present invention.

Referring now to FIG. 3, a schematic diagram of the preferred embodiment for the bilateral converter 10 of the present invention is shown. The first switch 18 couples one end of the inductor 14 to ground. The second switch 20 is coupled between the same end of inductor 14 and the bus 28. The other end of the inductor 14 is coupled through a resistor 30 to the battery 12. The two ends of the resistor 30 are coupled to separate inputs of an operational amplifier 32 to produce a signal indicating whether current is flowing to the battery 12. The output of amplifier 32 is coupled to an input of amplifier 34. The other input of amplifier 34 is coupled to receive the $I_{charge}$ signal. The $I_{charge}$ signal is a signal produced by the computer 13 of the satellite and indicates the desired charge rate for the battery 12. The $I_{charge}$ signal also allows the computer 13 to control the amount of charge that the battery 12 will receive based on its charge state and other factors such as the battery's age. Operational amplifier 34 compares the $I_{charge}$ signal to the amount of current sent to the battery 12 as indicated by the output of amplifier 32. The output of amplifier 34 is then coupled to node A (the controller 16) by a diode 36 to control the amount of charging current that is provided to the battery 12. It should be understood that a plurality of such bilateral converter circuits (BCDU2, BCDU3) may be coupled together to regulate the power between a solar array 15 a several batteries. Thus, the cathode of the diode 36 is preferably coupled to receive signals from other converters (BCDU2, BCDU3).

In the preferred embodiment of FIG. 3, the controller 16 preferably comprises a multiplier circuit 44 and a pulsewidth modulator 40 including an operational amplifier 42. The pulsewidth modulator 40 has a first control input that is coupled to receive the $V_{set}$ signal. The $V_{set}$ signal is a threshold voltage provided by the computer 13 to regulate the bus 28 independent of whether the battery 12 is being discharged or charged. The pulsewidth modulator 40 has a second control input coupled to the bus 28 by a resistor 46. The pulsewidth modulator 40 includes an operational amplifier 48 that compares the $V_{set}$ signal and the bus 28 voltage to regulate the output of the pulsewidth modulator 40. The output of the amplifier 48 is preferably coupled by a diode to node A, and thus, provides a feedback loop for amplifier 48.

The pulsewidth modulator 40 also receives input from the multiplier circuit 44. The multiplier circuit 44 preferably has two inputs. The first input is coupled to receive a proportionality constant signal from the satellite's computer 13. The proportionality constant signal is used by the computer 13 to regulate the percentage of the total power that each bilateral converter 10 can deliver or receive. For example, the proportionality constant may be varied such that one BCDU (Battery Charging Discharging Unit) may deliver 50% of the power while two other BCDUs each deliver 25% of the power. The other input to the multiplier circuit 44 is provided by the output of amplifier 42 that provides a signal indicative of the amount of current passing through the first switch 18, and thus through this particular bilateral converter or BCDU. The multiplier circuit 44 multiplies the signal output by amplifier 42 by the proportionality constant signal and sends the product to the pulsewidth modulator 40 in order to set the ratio control of current to the battery 12 relative to the other converters.

The pulsewidth modulator 40 is also coupled to receive the output of amplifier 42. As noted above, amplifier 42 provides a signal indicative of the amount of current passing through the first switch 18. A first input of the amplifier 42 is coupled to ground through a resistor 48. The first input of amplifier 42 is also coupled to the output of amplifier 42 by resistor 52. A second input of the amplifier 42 is coupled by a resistor 50 to an end of the first switch 18.

The output of the pulsewidth modulator 40 is used to control the closing of the first and second switches 18, 20. In the exemplary embodiment of FIG. 3, two outputs of the pulsewidth modulator 40 are coupled to diodes 54 and "OR" together to provide a signal with a wider range of duty cycle. The outputs of the diodes 54 are coupled through an inverter 56 to the control input of the first switch 18. Similarly, outputs of the diodes 54 are coupled through a resistor 58, an optical coupling device 60, and inverter 22 to the control input of the second switch 20. In the preferred embodiment, the first and second switches 18, 20 are field effect transistors. Since the first and second switches 18, 20 are controlled by a single control signal and its inverse, the switches 18, 20 must be one of two possible states. In the first state, the first switch 18 is open and the second switch 20 is closed, and an electrical path through the second switch 20 allows current to flow from the bus 28 through the inductor 14 to the battery 12, or vice versa. In the second state, the first switch 18 is closed and the second switch 20 is open, which disconnects the bus 28 from the inductor 14 and couples one end of the inductor 14 to ground through a resistor.

The pulsewidth modulator 40 advantageously varies the duty cycle of its output signal according to the input signals received. Depending on the duty cycle output by the pulsewidth modulator 40, the bilateral converter acts 10 as either a boost or a buck converter, and thus, can drive power in both directions. For example, if the power provided by the solar array 15 on bus 28 is adequate to drive the satellite's system loads as well as charge the battery 12, then the error amplifier 48 will be driven into saturation. The battery charging current will be controlled by the programed value by limiting the error amplifier excursion 48 by a current sense amplifier 42. On the other hand, if no power is provided by the solar array 15, the satellite's system load demand exceeds the power produced by the array, or not enough charge is provided to charge at the charge set point, then charging is automatically reduced until the charge goes to zero and the battery 12 begins sourcing the bus 28. The operation of the present invention is advantageous since the converter 10 continuously regulates the bus voltage by adjusting the duty cycle output by the pulsewidth modulator 40 independent of the mode in which the converter 10 is operating.

Figure 4:
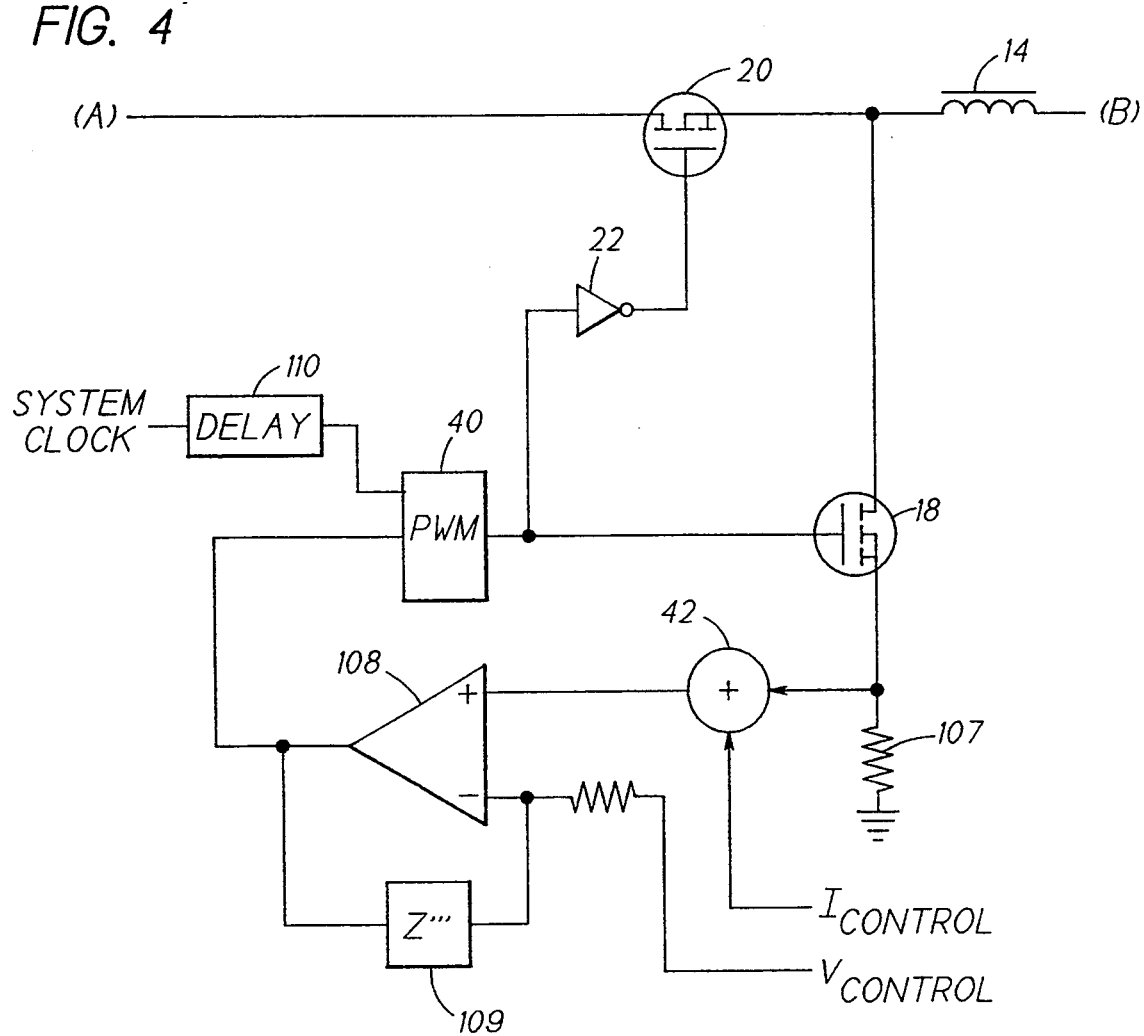
FIG. 4 is a schematic diagram of a preferred embodiment of an inner control loop which may be incorporated into the bilateral power converter system of the present invention.
Figure 5:
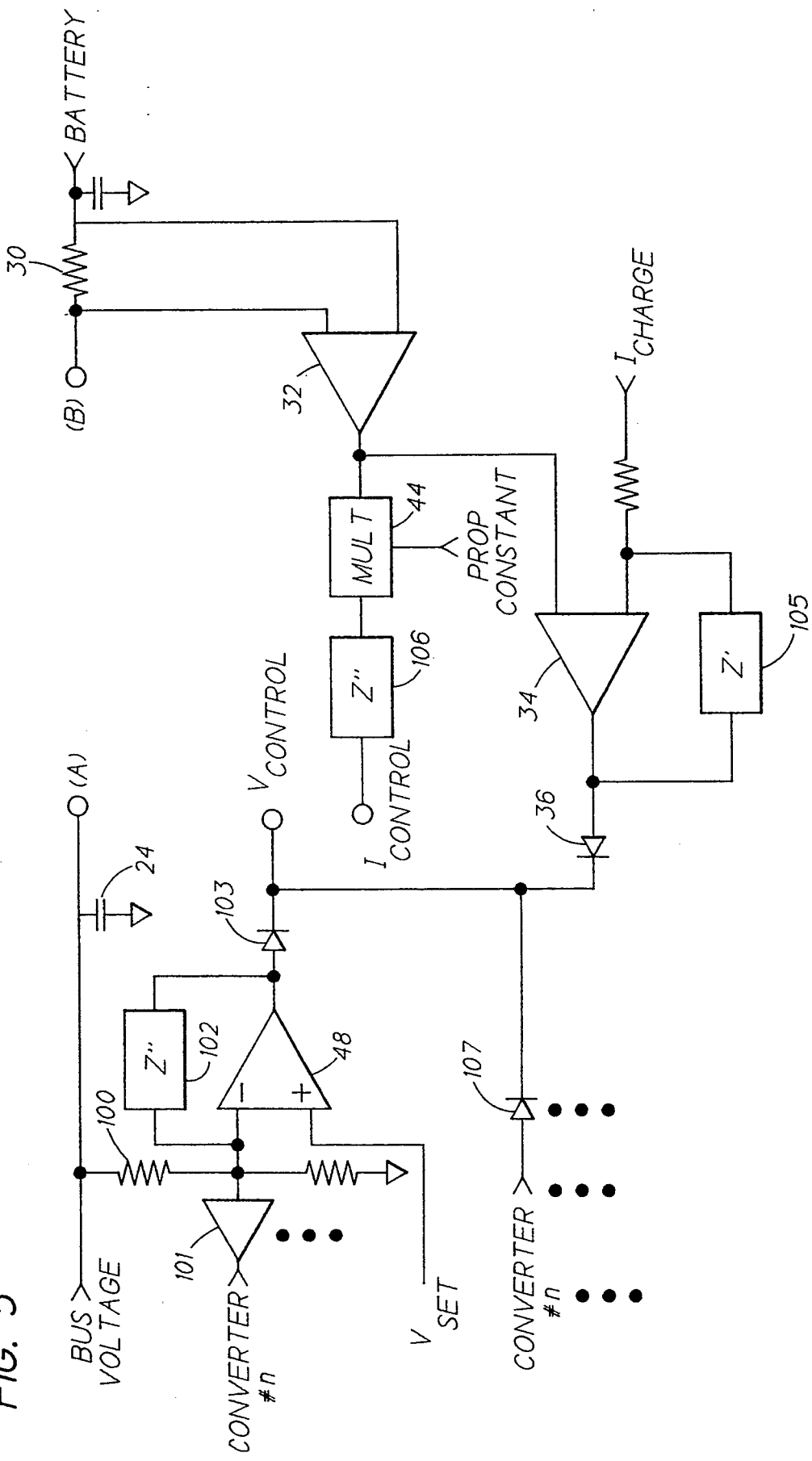
FIG. 5 is a schematic diagram of a preferred embodiment of an outer control loop which may be incorporated into the bilateral power converter system of the present invention.

In the preferred embodiment of FIG. 5, the depicted elements appear once in the converter, the elements of the preferred embodiment of FIG. 4 being attached in one or more embodiments all together at the nodes shown in FIG. 5.

In the preferred embodiment of FIG. 5, the outer, voltage control loop contains a resistor divider network 100, a plenitude of buffers 101 to communicate the signal generated by 100 to all other converters in the system, and an amplifier 48. The amplifier has a first control input that is coupled to receive the Vset signal. The Vset signal is a voltage provided by the computer (not shown) to regulate the bus (28) voltage. The amplifier 48 has a second input coupled to the bus by the resistor divider network 100. The amplifier has feedback 102 to control the frequency characteristics of ths bus control.

The voltage control loop also consists of a diode 103 to determine which of the various signals attached to the node Vcontrol will control the duty cycle. The loop also contains a plenitude of control inputs, one for each other converter in the system. Each of these is coupled to the node Vcontrol through a diode, such as 104 in the Figure, with which they are connected in a manner that the highest signal controls the duty cycle.

In the preferred embodiment of FIG. 5, the outer, current limiting control loop contains a resistor 30 to sense total current into or out of the battery. The common-mode voltage of this signal is removed by amplifier 32, which also amplifies the signal. Amplifier 32 has an input from node (B), connected to the nodes (B) represented in FIG. 4, and a second input from the battery.

The output of amplifier 32 is one input to amplifier 34. Amplifier 34 has a second input, which is a voltage provided by the computer (not shown) to limit the maximum charge current into the battery. Amplifier 34 also has feedback 105 to control the frequency characteristics of the current control loop, and a diode 36 to couple it to the node Vcontrol, with which it is connected in a manner that the highest signal controls the duty cycle.

The preferred embodiment FIG. 5 also shows a portion of the inner, high-frequency average current loop. The output of the amplifier 32 is connected to one input of a multiplier, 44. The other input of the multiplier is connected to the Proportionality constant signal. The proportionality constant signal is a voltage provided by the computer (not shown) to determine the ratios of currents being provided to or from the battery attached to each converter (the batteries need not be each of the same voltage). The output of the multiplier 44 is attached to a (possibly active) filter network 106, which shapes the frequency characteristics of the inner control loop signal provided at the node Icontrol to the rest of the inner control loops represented in FIG. 4.

In the preferred embodiment of FIG. 4, which may be repeated multiple times within a converter, a first switch 20 is connected to the node (A) of FIG. 5. It is also connected to an inductor 14, and to a second switch 18. Switch 18 is connected via a current sensing resistor 107 to ground. The inductor 14 is also connected to the node (B) of FIG. 5. The current sensed in resistor 107 is a peak-current. It is added in adder 42 to the total current control voltage Icontrol, produced on FIG. 5. In the preferred embodiment, the peak current would be about 5% of the amplitude of the total current. The addition of the peak current to the total current ensures that each occurrence of the FIG. 4 within the converter will take an equal share of the total current of the converter.

The output of the adder 42 is connected to one input of the amplifier 108. A second input to amplifier 108 is connected to the node Vcontrol, which is generated on FIG. 5, and is the outer control loop signal controlling the inner loop. The amplifier 108 also has a feedback 109 which controls the frequency characteristics of the inner control loop. The output of the amplifier 108 is one input to the pulse-width modulator 40, which converts its input signals into a duty cycle.

The other input to the pwm 40 is for the system clock, through a delay 110. The delay is different for each example of FIG. 4 included within the converter, the delay serving to stagger the units to reduce input and output ripples of the converter. The delayed system clock acts to initiate the duty cycle of the pwm 40. The output of the pulse-width modulator 40 is a duty cycle modulated signal used to control the two switches, 18 and 20. Switch 18 is controlled directly by the pwm 40, whereas switch 20 is controlled by the inverted signal from the pwm, the inversion being accomplished by inverter 22. Inverter 22 also acts to convert the drive signal to the appropriate voltage level for switch 20.

Having described the present invention with reference to specific embodiments, the above description is intended to illustrate the operation of the preferred embodiments and is not meant to limit the scope of the invention. The scope of the invention is to be delimited only by the following claims. From the above discussion, many variations will be apparent to one skilled in the art that would yet be encompassed by the true spirit and scope of the present invention.

What is claimed is:

1. A bilateral power converter system comprising at least one bilateral power conversion unit, said at least one power conversion unit comprising:
   at least one inductance having a first terminal and a second terminal, said first terminal for coupling to a first terminal of an electrical power source/sink;
   a common bus for coupling to a second terminal of the power source/sink;
   a power bus for coupling to an electrical power source;
   a capacitance coupled between said power bus and said common bus;
   at least one first switching means having a first terminal coupled to said second terminal of said at least one inductance, a second terminal coupled to said common bus, and a control terminal responsive to a first control signal for coupling said first terminal to said second terminal in response to a first state of said first control signal and for uncoupling said first terminal from said second terminal in response to a second state of said first control signal;
   at least one second switching means having a first terminal coupled to said second terminal of said at least one inductance, a second terminal coupled to said power bus, and a control terminal responsive to a second control signal for coupling said first terminal to said second terminal in response to said first state of said second control signal and for uncoupling said first terminal from said second terminal in response to said second state of said second control signal; and
   a control circuit having a first input terminal for inputting a first signal that indicates a magnitude of a voltage potential between said power bus and said common bus, said control circuit having a second input terminal for inputting a second signal that indicates a magnitude of a reference voltage potential, said control circuit having a third input terminal for inputting a third signal that indicates a magnitude of a current flow through said first switching means, said control circuit having an output terminal for outputting a single control signal having a pulse width set in accordance with said first signal, said second signal, and said third signal for controlling both the magnitude and the direction of the current flow through said at least one inductance to maintain the magnitude of the voltage potential of said power bus at a magnitude specified by said second signal;
   wherein said single control signal is coupled to said control terminal of one of said first switching means and said second switching means, and wherein an inverse of said single control signal is coupled to said control terminal of the other one of said first switching means and said second switching means.

2. A bilateral power converter system as set forth in claim 1 wherein there are at least two of said power conversion units, and further comprising:
   multiplier means having a first input terminal coupled to said third signal and a second input terminal coupled to a predetermined current proportionality signal, said multiplier means having an output terminal coupled to a fourth input terminal of said control circuit for outputting thereto a signal that is indicative of a product of said third signal and said predetermined current proportionality signal, and wherein
   said control circuit outputs said single control signal to have a pulse width set in accordance with said first signal, said second signal, said third signal, and also said output of said multiplier means for maintaining the magnitude of the current flow through said at least one inductance at a level indicated by said predetermined current proportionality signal, wherein said predetermined current proportionality signal specifies a ratio of currents to be supplied by individual ones of said at least two power conversion units.

3. A bilateral power converter system as set forth in claim 1 wherein said at least one power conversion unit further comprises:
   means for sensing the magnitude of the current flow through said at least one inductance, said sensing means having an output; and
   first comparing means having a first input coupled to said output of said sensing means and a second input coupled to an input signal that specifies a maximum magnitude of a current flow through said at least one inductance, said first comparing means having an output coupled to said control circuit, and wherein said control circuit is responsive to said output of said first comparing means for selectively limiting the current flow through said at least one inductance in accordance therewith.

4. A bilateral power converter system as set forth in claim 1 wherein said at least one power conversion unit further comprises:
   second comparing means for comparing said first signal to said second signal, said second comparing means having an output signal for indicating a difference between (a) the magnitude of the voltage potential between said power bus and said common bus and (b) the magnitude of a reference voltage potential, said output of said second comparing means being coupled to said output of said first comparing means at a power conversion unit voltage control node; wherein
   said bilateral power conversion system is comprised of a plurality of said power conversion units; wherein
   said power conversion unit voltage control node of each of said power conversion units is coupled in common to said power conversion unit voltage control node of each of said plurality of power conversion units; and wherein
   the duty cycle of said control signal output from each of said control units of each of said plurality of power conversion units is set in accordance with a power conversion unit voltage control node that has a greatest magnitude.

5. A bilateral power converter system for use on a space-based platform having a battery and a solar panel, said converter system comprising at least one bilateral power conversion unit, said at least one power conversion unit comprising:
   at least one inductance having a first terminal and a second terminal, said first terminal for coupling to a first terminal of said battery;
   a common bus for coupling to a second terminal of said battery;
   a power bus for coupling to an output of said solar panel;
   a capacitance coupled between said power bus and said common bus;

at least one first switching means having a first terminal coupled to said second terminal of said at least one inductance, a second terminal coupled to said common bus, and a control terminal responsive to a first control signal for coupling said first terminal to said second terminal in response to a first state of said first control signal and for uncoupling said first terminal from said second terminal in response to a second state of said first control signal;

at least one second switching means having a first terminal coupled to said second terminal of said at least one inductance, a second terminal coupled to said power bus, and a control terminal responsive to a second control signal for coupling said first terminal to said second terminal in response to said first state of said second control signal and for uncoupling said first terminal from said second terminal in response to said second state of said second control signal; and a control circuit having a first input terminal for inputting a first signal that indicates a magnitude of a voltage potential between said power bus and said common bus, said control circuit having a second input terminal for inputting a second signal that indicates a magnitude of a reference voltage potential, said control circuit having a third input terminal for inputting a third signal that indicates a magnitude of a current flow through said at least one first switching means, said control circuit having an output terminal for outputting a single control signal having a pulse width set in accordance with said first signal, said second signal, and said third signal for controlling the magnitude and the direction of the current flow through said at least one inductance to maintain the magnitude of the voltage potential of said power bus at a magnitude specified by said second signal;

wherein said single control signal is coupled to said control terminal of one of said at least one first switching means and said at least one second switching means, and wherein an inverse of said single control signal is coupled to said control terminal of the other one of said at least one first switching means and said at least one second switching means.

6. A bilateral power converter system as set forth in claim 5 wherein there are at least two of said power conversion units, and further comprising:

multiplier means having a first input terminal coupled to said third signal and a second input terminal coupled to a predetermined current proportionality signal, said multiplier means having an output terminal coupled to a fourth input terminal of said control circuit for outputting thereto a signal that is indicative of a product of said third signal and said predetermined current proportionality signal, and wherein said control circuit outputs said single control signal to have a pulse width set in accordance with said first signal, said second signal, said third signal, and also said output of said multiplier means for maintaining the magnitude of the current flow to or from said battery at a level indicated by said predetermined current proportionality signal, wherein said predetermined current proportionality signal specifies a ratio of currents to be supplied by individual ones of said at least two power conversion units.

7. A bilateral power converter system as set forth in claim 5 wherein said at least one power conversion unit further comprises:

means for sensing the magnitude of the current flow to or from said battery, said sensing means having an output; and first comparing means having a first input coupled to said output of said sensing means and a second input coupled to an input signal that specifies a maximum magnitude of a battery charging current, said first comparing means having an output coupled to said control circuit, and wherein said control circuit is responsive to said output of said first comparing means for selectively limiting said battery charging current in accordance therewith.

8. A bilateral power converter system as set forth in claim 5 wherein said at least one power conversion unit further comprises:

second comparing means for comparing said first signal to said second signal, said second comparing means having an output signal for indicating a difference between (a) the magnitude of the voltage potential between said power bus and said common bus and (b) the magnitude of a reference voltage potential, said output of said second comparing means being coupled to said output of said first comparing means at a power conversion unit voltage control node; wherein said bilateral power conversion system is comprised of a plurality of said power conversion units, each having an associated battery that is charged or discharged therefrom; wherein said power conversion unit voltage control node of each of said power conversion units is coupled in common to said power conversion unit voltage control node of each of said plurality of power conversion units; and wherein the duty cycle of said control signal output from each of said control units of each of said plurality of power conversion units is set in accordance with a power conversion unit voltage control node that has a greatest magnitude.

9. A method for operating a bilateral power converter system for use on a space-based platform comprised of a solar panel having an output coupled to a power bus, the converter system comprising at least two bilateral power conversion units that are coupled to a first terminal of an inductance and, through the inductance, to a battery having a first terminal coupled to a second terminal of the inductance and a second terminal coupled to a common bus, the method operating each one of the bilateral power conversion units by the steps of:

comparing a signal indicating a magnitude of a voltage potential between the power bus and the common bus to a signal indicating a reference voltage potential to obtain a first difference signal;

sensing a total current flowing through the power bus to generate a sensed current signal;

comparing the sensed current signal to a signal indicating a reference battery charging current signal to obtain a second difference signal;

selecting a largest one of the first difference signal and the second difference signal to provide a voltage control signal;

multiplying the sensed current signal times a signal indicating a proportion of a total current to be provided by one of at least two bilateral power conversion units to provide a first current control signal;

sensing a peak current flowing through the bilateral power conversion unit to generate a sensed peak current signal;

adding the sensed peak current signal to the first current control signal to generate a second current control signal;

combining the second current control signal with the voltage control signal and varying the output of a pulse width modulator in accordance with the combined signal to generate a pulse width modulated switching signal;

driving a first switching transistor with a first version of the pulse width modulated switching signal, the first switching transistor being coupled between the power bus and the first terminal of the inductance; and simultaneously driving a second switching transistor with a second, inverted version of the pulse width modulated switching signal, the second switching transistor being coupled between the first terminal of the inductance and the common bus.

10. A method as set forth in claim 9 wherein each of said at least two bilateral power conversion units has an associated battery that is charged or discharged therefrom, and further including the steps of:

coupling together in common the voltage control signal from each of the power conversion units; and varying the output of the pulse width modulator in accordance with a largest one of the voltage control signals to generate the pulse width modulated switching signal.

11. A bilateral power converter system for use on a space-based platform comprised of a solar panel having an output coupled to a power bus, comprising:

at least two bilateral power conversion units each of which is coupled to a first terminal of an inductance and, through said inductance, to a battery having a first terminal coupled to a second terminal of said inductance and a second terminal coupled to a common bus; each of said bilateral power conversion units further comprising, a first switching transistor coupled between said power bus and said first terminal of said inductance;

a second switching transistor coupled between said first terminal of said inductance and said common bus; means for comparing a signal indicating a magnitude of a voltage potential between said power bus and said common bus to a signal indicating a reference voltage potential to obtain a first difference signal;

means for sensing a total current flowing through the power bus to generate a sensed current signal;

means for comparing said sensed current signal to a signal indicating a reference battery charging current signal to obtain a second difference signal;

means for selecting a largest one of said first difference signal and said second difference signal to provide a voltage control signal;

means for multiplying said sensed current signal times a signal indicating a proportion of a total current to be provided by said bilateral power conversion unit to provide an first current control signal;

means for sensing a peak current flowing through said bilateral power conversion unit to generate a sensed peak current signal;

means for adding said sensed peak current signal to said first current control signal to generate a second current control signal;

means for combining said second current control signal with said voltage control signal;

means for varying an output of a pulse width modulator in accordance with said combined signal to generate a single pulse width modulated switching signal;

means for driving said first switching transistor with a first version of said single pulse width modulated switching signal, said first switching transistor being coupled between said power bus and said first terminal of said inductance; and means for simultaneously driving said second switching transistor with a second version of said single pulse width modulated switching signal, said second switching transistor being coupled between said first terminal of said inductance and said common bus, wherein said second version is the inverse of said first version.

12. A system as set forth in claim 11 wherein each of said at least two bilateral power conversion units has an associated battery that is charged or discharged therefrom, and further comprising:

means for coupling together in common said voltage control signal from each of said power conversion units; and wherein said means for varying said output of said pulse width modulator is responsive to a largest one of said voltage control signals to generate said pulse width modulated switching signal in accordance therewith.

13. A system as set forth in claim 11 wherein each of said at least two bilateral power conversion units includes a plurality of pairs of said first and second switching transistors, and further comprising:

means for generating a synchronizing clock signal for use in driving said plurality of pairs of switching transistors; and means for delaying said synchronizing clock signal to provide a plurality of phases thereof, each of the phases being used for driving one of the plurality of pairs of switching transistors.

14. A system as set forth in claim 13 wherein there are n pairs of said switching transistors and wherein a phase delay between said plurality of phases is 360°/n, whereby a ripple amplitude is reduced and a ripple frequency is increased for power flowing through said power bus.

* * * * *